US010001943B2

(12) United States Patent
Parra

(10) Patent No.: US 10,001,943 B2
(45) Date of Patent: Jun. 19, 2018

(54) DATA STREAM PROCESSOR AND METHOD TO THROTTLE CONSUMPTION OF MESSAGE DATA IN A DISTRIBUTED COMPUTING SYSTEM

(71) Applicant: HomeAway.com, Inc., Austin, TX (US)

(72) Inventor: Rene X. Parra, Austin, TX (US)

(73) Assignee: HomeAway.com, Inc., Austin, TX (US)

( * ) Notice: Subject to any disclaimer, the term of this patent is extended or adjusted under 35 U.S.C. 154(b) by 220 days.

(21) Appl. No.: 14/935,209

(22) Filed: Nov. 6, 2015

(65) Prior Publication Data

US 2017/0131936 A1 May 11, 2017

(51) Int. Cl.
*G06F 3/06* (2006.01)
*H04L 29/08* (2006.01)
*H04L 12/26* (2006.01)

(52) U.S. Cl.
CPC .......... *G06F 3/0644* (2013.01); *G06F 3/0604* (2013.01); *G06F 3/0643* (2013.01); *G06F 3/0653* (2013.01); *G06F 3/0673* (2013.01); *H04L 43/08* (2013.01); *H04L 67/10* (2013.01)

(58) Field of Classification Search
CPC ................................ H04L 43/08; H04L 67/10
See application file for complete search history.

(56) References Cited

U.S. PATENT DOCUMENTS

2016/0277268 A1* 9/2016 Brown ................... H04L 67/10

* cited by examiner

*Primary Examiner* — Adnan Mirza
(74) *Attorney, Agent, or Firm* — Knobbe, Martens, Olson & Bear, LLP

(57) ABSTRACT

Various embodiments relate generally to electrical and electronic hardware, computer software and systems, and wired and wireless network communications for establishing a data stream processor configured to regulate consumption of message data. A system and method are configured to throttle data from a client computing device, whereby the detection of the subset of message data is accessed in real-time as message data streams through or adjacent to the data stream processor. In some examples, a method can include receiving message data including calls to access a pool of data, classifying a subset of messages, appending the classified subset of messages to a partition of memory, fetching the classified subset of messages to form a data stream, accessing the data stream by a data stream processor to extract a stream characteristic, monitoring a state of the data stream based on the stream characteristic against a threshold, and generating throttle data.

20 Claims, 8 Drawing Sheets

400

DATA STREAM PROCESSOR AND METHOD TO THROTTLE CONSUMPTION OF MESSAGE DATA IN A DISTRIBUTED COMPUTING SYSTEM

FIELD

Various embodiments relate generally to electrical and electronic hardware, computer software and systems, wired and wireless network communications, and wearable computing devices for establishing a data stream processor configured to regulate communication of a subset of message data. In particular, a system, a device and a method may be configured to throttle responsive to a request by a client computing device, whereby the detection of a subset of message data may be identified in real-time as data streams through or adjacent to a data stream processor.

BACKGROUND

Vacation rental marketplaces in which disparate owners of second or vacation homes have experienced increasing growth recently. In a vacation rental marketplace, a family or a group of people (e.g., group of friends) may rent anything from cabins, condominiums, summer homes, to villas, barns, farm houses, and castles. These types of rental properties are desirable as typical hotel or motel buildings are not well-suited to accommodate families or groups of people, and are usually less private and less comforting to some guests.

With the advent of networked computing devices, the computer-based renting of properties electronically has enabled travelers to more readily enjoy the experiences of renting others' homes. However, some conventional techniques and known technological approaches to renting properties via computer networks typically employ an increasing numbers of computing systems (e.g., hundreds or thousands of computing devices, including servers and databases) over which those computing systems are distributed conventionally or arranged using typical sharded database schemas. Regardless of whether inadvertent or due to malevolent intent, one or more client devices can cause numerous accesses to various different servers, sometimes redundantly, and without significant regulation. As such, an entity (e.g., a corporate entity) may experience an impairment to its computing resources, which, in turn, reduces the efficacy of serving data, such as webpages, to prospective consumers of data.

Without a centralized proxy, regulation of such runaway messaging requests to conventional distributed computing networks may be relatively costly in terms of computing resources, manpower, and capital.

Thus, what is needed is a solution for throttling message data in a data stream processor disposed in a distributed computerized rental system without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
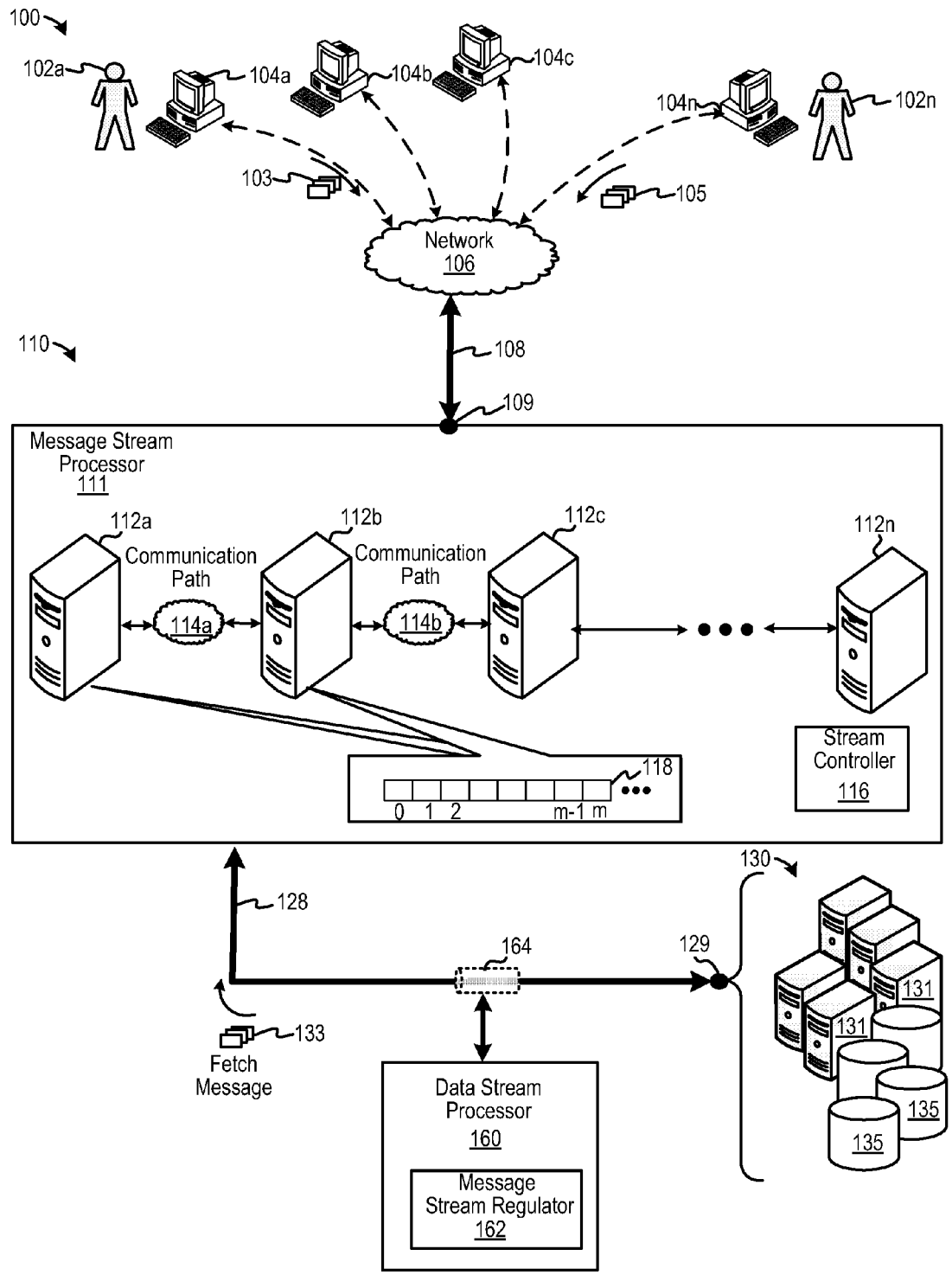
FIG. 1 is a diagram depicting a data stream processor including a message stream regulator, according to some embodiments.

FIG. 1 is a diagram depicting a data stream processor including a message stream regulator, according to some embodiments. Diagram 100 includes a data stream processor 160 including a message stream regulator 162 that may be configured to, among other things, facilitate regulation of message data streaming to and/or in distributed computing system 110. Distributed computing system 110 is configured to provide an infrastructure to implement a networked computerized system configured to facilitate rental of vacation property (or other data-supported transactions) via a network 106 (e.g., the Internet) with a computing device 104a, a computing device 104b, a computing device 104c, a computing device 104n, and the like. Hundreds or thousands (or more) computing devices, such as computing devices 104a to 104n, may transmit, for example, 15,000 to 20,000 calls per second into distributed computing system 110. As another example, more than 20,000 calls or subsets of message (e.g., 2 million calls per second or greater) may be communicated with distributed computing system 110.

In the example shown, a user 102a, such as a prospective traveler, may cause computing device 104a to generate a call 103 via network 106 and via communications path 108 to distributed computing system 110. Call 103 can include message data that is generated responsive to interactions with a user interface of computing device 104a. For example, call 103 may include message data configured to facilitate a search of rental properties based on certain property characteristics (e.g., location, number of bedrooms, number of bathrooms, etc.), facilitate presentation of the specific property listing, invoke an electronic message application (e.g., to enable communication between travelers and owners) in a dashboard presented on the user interface, and the like. Similarly, a user 102n, such as an owner, may cause computing device 104n to transmit a call 105 to distributed computing system 110. According to various examples, calls 103 and 105 may include a subset of message data configured to request other data, data configured to cause generation of new data based on execution of code, data configured to transfer control to a program (e.g., a method), or the like.

Distributed computing system 110, according to the example shown in diagram 100, may include a message stream processor 111 and a pool 130 of any number of servers 131 and databases 135, including storage devices and memory. Note that any of servers 131 or databases 135 may be co-located in, or distributed over, any number of geographic regions. Message stream processor 111 may be configured to provide a data conduit or data channel (e.g., "data pipe") having a relatively ultra-high throughput for data passing through messages stream processor 111, or between points 109 and 129 (e.g., through message stream processor 111 and path 128). Message stream processor 111 may also be configured to provide a relatively low latency through messages stream processor 111, or between points 109 and 129 (e.g., through message stream processor 111 and path 128).

Pool 130 of servers 131 and databases 135 may include hardware, software, or a combination thereof, to implement logic configured to execute instructions to process requests and access data from distributed processors and/or memory devices to fulfill requests generated by computing devices 104a to 104n. For example, databases 135 may include data representing property listing information including, but not limited to, the type of property (e.g., a condo or single-family house), a location or topography (e.g., in a forest, in an arid climate, in a mountainous region, etc.), a number of bedrooms, a number of bathrooms, a cost per unit time (such as per day or per week), a listing of available amenities, available images of the property rental and its environs, a set of reviews regarding the property listing by past guests, and the like. In some examples, logic in pool 130 may be configured to generate message 133 (e.g., a fetch message) via path 128 to fetch messages from message stream processor 111 for consumption and subsequent processing, as well as presentation via network 106 to one of computing devices 104a to 104n (e.g., message 133 can cause other data messages to be transmitted from system 110 to the originating computing device).

Further to diagram 100, message stream processor 111 is shown to include any number of server computing devices 112a to 112n, one or more of which may be coupled together via communication paths, such as networks 114a and 114b. Server computing devices 112a to 112n may be configured to include memory for storing data structures 118 in which messages may be stored in an order (e.g., a sequential order, such as message ID 0, message ID 1, message ID 2, . . . , message ID 'm−1,' and message ID 'm'), whereby later-received messages can be appended to data structure 118 consistent with the aforementioned order. According to some embodiments, message stream processor 111 may be configured to classify subsets of messages received from path 108 to form classified subsets of messages. In at least one embodiment, message stream processor 111 may be configured to stream message data of a certain classification to a corresponding data structure 118. In particular, a data structure, such as data structure 118, may be associated with specific message type or classification. For example, one or more data structures 118 may be configured to receive streams of message data classified as "calls to perform search queries" on a property listing, or any other type of message. In some embodiments, a call can include event data or other types of data. According to some embodiments, each data structure 118 may be implemented as an independently-accessible partition of memory.

Stream controller 116 may include hardware, software, or a combination thereof, to implement logic configured to control the process of appending messages to corresponding data structures and to facilitate fetch operations to stream one or more subsets of message data from a given data structure 118 to a server process configured to consume the one or more subsets of message data. In some embodiments, stream controller 116 may be configured to manage the "publication" of messages from producing processes to "subscribers" of messages that consume the message data therein. As such, stream controller 116, or any other structure and/or function of message stream processor 111 or distributed computing system 110, may be configured to implement a publish-subscribe model of messaging.

According to some examples, message stream processor 111 may be configured to provide a data throughput of, for instance, 30 to 190 MB/sec, or greater, and further configured to provide a throughput of 200,000 to 500,000 messages per second, or greater (e.g., for a message size of 50 to 200 bytes or greater). Further, message stream processor 111 may be configured to provide latencies (e.g., end-to-end) of less than 15 milliseconds, such as, for example, an average latency of 2 to 3 milliseconds, or less. Accordingly, large quantities of data and message data may stream rapidly via path 128.

Data stream processor 160 is configured to access the streams of data at a portion 164 of path 128 to, for example, extract a stream characteristic from a stream of data associated with a classified subset of messages. Data stream processor 160 includes a message stream regulator 162 may be configured to regulate the quantities of subsets of message data streaming between computing devices 104a to 104n and a point within distributed computing system 110, such as point 129 adjacent or at pool 130 of servers 131 and databases 135. Message stream regulator 162 may be configured to monitor a state of the data stream based on a stream characteristic extracted from, or otherwise detected in, streams of data on path 128. In particular, message stream regulator 162 may compare a value of a state (e.g., a number of calls per second) associated with the stream characteristic (e.g., an identifier of a computing device 104) against data representing a threshold (e.g., 500 calls per second) to determine whether the state exceeds the threshold. As such, a stream characteristic can identify a specific computing device 104 in a group of computing devices 104a to 104n, and a value of a monitored state may represent a number of calls from that specific computing device 104 in an interval of time.

A service level agreement (e.g., an SLA) or a general rule may be used to set the threshold value at which message stream regulator 162 regulates a flow of data associated with a subset of messages (e.g., a subset of messages from a specific computing device 104). Thus, message stream regulator 162 can generate throttle data to throttle computing device 104, or one or more subsets of messages therefrom, for a specific time interval. For example, messages from computing device 104 may be throttled or otherwise blocked from passing through one or more portions of distributed computing system 110 for an interval of one (1) second or any other time interval during which message traffic or other data associated with a computing device is disabled. According to alternative examples, a stream characteristic upon which throttling maybe based can include a type of message. As such, message stream regulator 162 can determine that a specific quantity of a certain type of message exceeds a threshold amount and, in response, message stream regulator 162 may throttle or otherwise block that specific type of message for a certain interval.

In view of the foregoing, the structures and/or functionalities of distributed computing system 110 and its components, including message stream processor 111 and data stream processor 160, can access data (e.g., directly access data) representing a stream characteristic from a data stream (e.g., an unbounded transmission of messages that may be in transit). For example, the access data need not be accessed from disk for purposes of extracting the stream characteristic. Based on the accessed data, a flow rate or quantity of message data for a subset of messages may be throttled or otherwise regulated based on whether a state value associated with a stream characteristic exceeds a threshold value or range. In accordance with various embodiments, data stream processor 160 and/or message stream regulator 162 may be configured to access data representing a stream characteristic in real-time, or substantially in real-time. According to some embodiments, a data stream is in an unbounded sequence of messages or units of data (e.g., expressed in any format, including tuples) as the data for the messages or the units of data transit or otherwise are communicated from one point to another point within distributed computing system 110. According to some embodiments, the term "real-time" refers an amount of time sufficient to perform the method or execute instructions to perform an operation, such as detecting calls from a certain computer and to determine that the number of calls exceeds a threshold based on accessed data from the data stream. In some cases, affirmative requests for such data need not be necessary, and, as such, the data need not be retrieved from disk. In some examples, the term real-time can describe the implementation of message stream regulator 162 "in-memory," such as in RAM or other like memory. According to some implementations, the term real-time can describe an amount of time between a threshold excursion is detected and a point in time when messages from a computing device 104 are throttled. An average latency may be between 1.5 and 2.5 milliseconds, which may be an amount of time throttling is effected in real-time. Or, the throttling may be effected, for example, in 3 milliseconds or less. Therefore, a subset of message data may be detected and throttled in real-time as the subset of message data streams by, or adjacent to, data stream processor 160. Thus, data stream processor 160 can facilitate reduction or elimination of anomalous requests and message data generated by "bugs" in code that might generate numerous calls from a computing device (e.g., caused by an infinite loop of calls), or by ill-intentioned parties (e.g., denial of service, or DOS, attacks).

Figure 2:
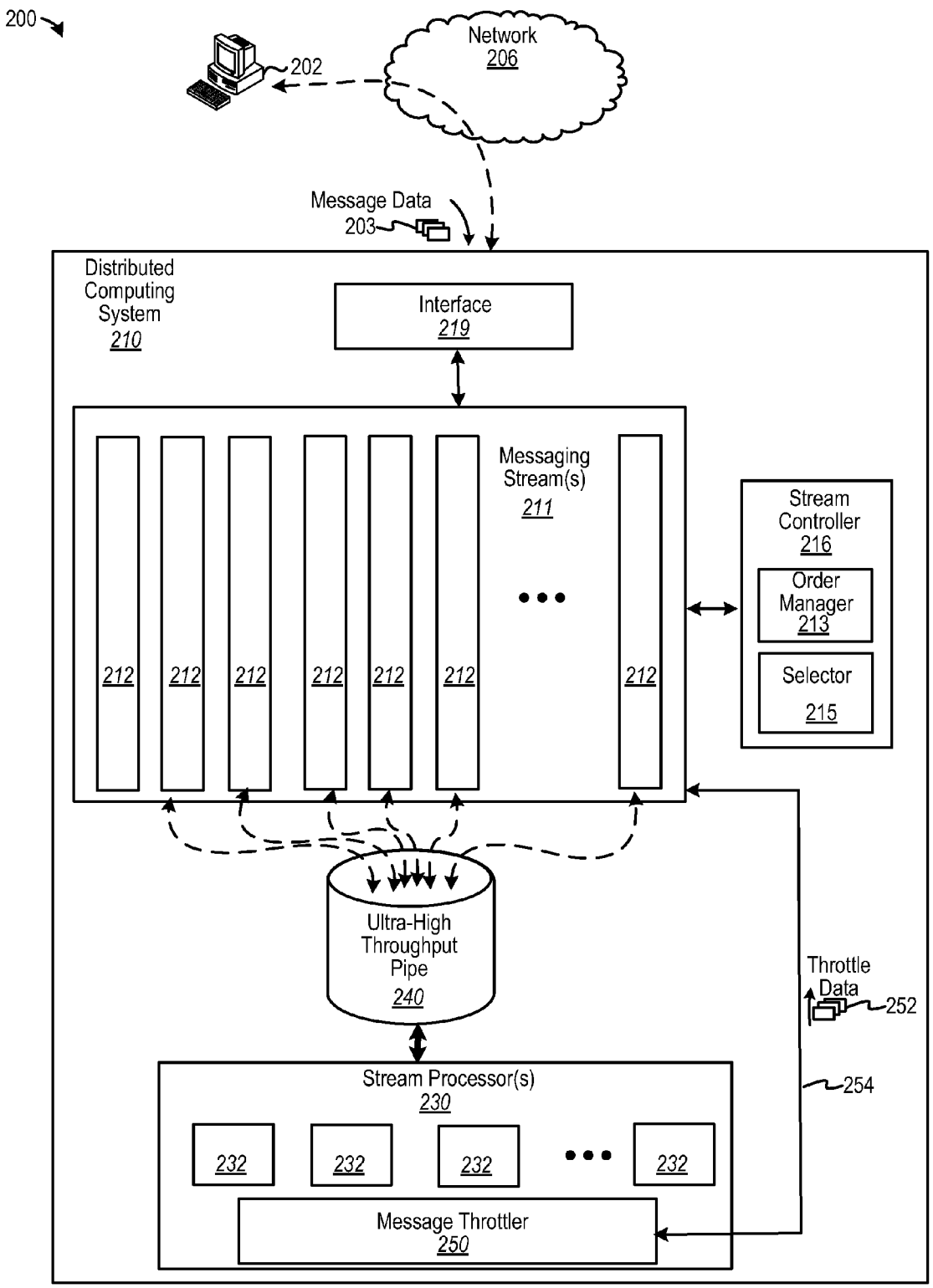
FIG. 2 is a diagram depicting an example of a logical representation of a distributed computing system, according to some examples.

FIG. 2 is a diagram depicting an example of a logical representation of a distributed computing system, according to some examples. Diagram 200 depicts a distributed computing system 210 configured to throttle transmission and/or reception of subsets of messages 203 exchanged between a computing device 202 via network 206 and distributed computing system 210. Note that elements depicted in diagram 200 of FIG. 2 may include structures and/or functions as similarly-named or similarly-numbered elements depicted in other drawings.

Distributed computing system 210 is shown to include an interface 219, messaging streams 211, a stream controller 216, an ultra-high throughput pipe 240, and stream processor(s) 230. Messaging streams 211 includes a number of data arrangements 212 into which messages stream. According to some examples, data arrangements 212 may be partitions of memories formed as logical logs, which may be implemented as, for example, a set of segment files that may or may not be approximately the same size (e.g., 1 GB or greater). Further, one or more data arrangements 212—as partitions—may be configured to receive messages of a specific type of message, classification, or "topic." In some cases, the topic may be a category or an attribute of messages for a specific data feed. According to some embodiments, messaging streams 211, as well as other elements of distributed computing system 210 (e.g., interface 219 and other interfaces), may operate to provide relatively high throughput for transmitting messages that can be represented as ultra-high throughput pipe 240.

Interface 219 may can be configured as one or more application programming interfaces, or APIs, so as to direct certain messages (e.g., via classification of such messages) to a corresponding data arrangement 212. Interface 219 may also be configured to encode messages (e.g., via the configurable method of serialization) for transmission or "publication" to a corresponding data arrangement 212.

Stream controller 216 is configured to control messages entering and exiting messaging streams 211 as shown, stream controller 216 may include an order manager 213 and a selector 215. Order manager 213 is configured to append incoming messages of a specific classification to a corresponding data arrangement 212 or log in some cases, order manager 213 may also be configured to assign a sequential ID number to each message whereby the sequential ID numbers provide for an order. According to some examples, the sequential ID number may be referenced as an "offset." Selector 215 is configured to fetch subsets of message data from data arrangements 212 based on the sequential ID number, and may be further configured to transmit message data to one or more computing devices and/or processes that are consumers of the data. According to some embodiments, selector 215 may be configured to stream message data via another applications programming interface, or API, to the one or more consuming computing devices. According to some embodiments, order manager 213 and selector 215 may be implemented in hardware, software, or a combination thereof.

Stream processors 230 include one or more portions of hardware and/or software that are configured to implement real-time data processors 232. According to some embodiments, a real-time data processor 232 may be implemented as a message throttler 250. Note that message throttler 250 depicted in diagram 200 of FIG. 2 may include structures and/or functions similar to, for example, message stream regulator 162 of FIG. 1. Message throttler 250 may be configured to detect one or more characteristics of a data stream in real-time or substantially in real-time, and to determine whether any of the one or more characteristics is associated with a non-conforming value relative to a threshold value or threshold range. For example, a threshold value may be set to enforce a rule or limit that a computing device may not generate more than a certain number of calls per second. Consider that 100 calls per second is a threshold value. Thus, 150 calls per second may be considered a non-conforming value. As such, message throttler 250 may generate throttle data 252, responsive to detecting the non-conforming value, whereby throttle data 252 may include an executable instruction to suspend processing a subset of messages (e.g., associated with a specific the computing device), as well as data representing a time at which the processing of the subset of messages is re-enabled (e.g., a computing device may be disabled or barred from accessing distributed computing system 210 for one second). According to some examples, throttle data 252 may be transmitted via path 254 to any element in distributed computing system 210, such as messaging streams 211 or other elements therein.

Figure 3:
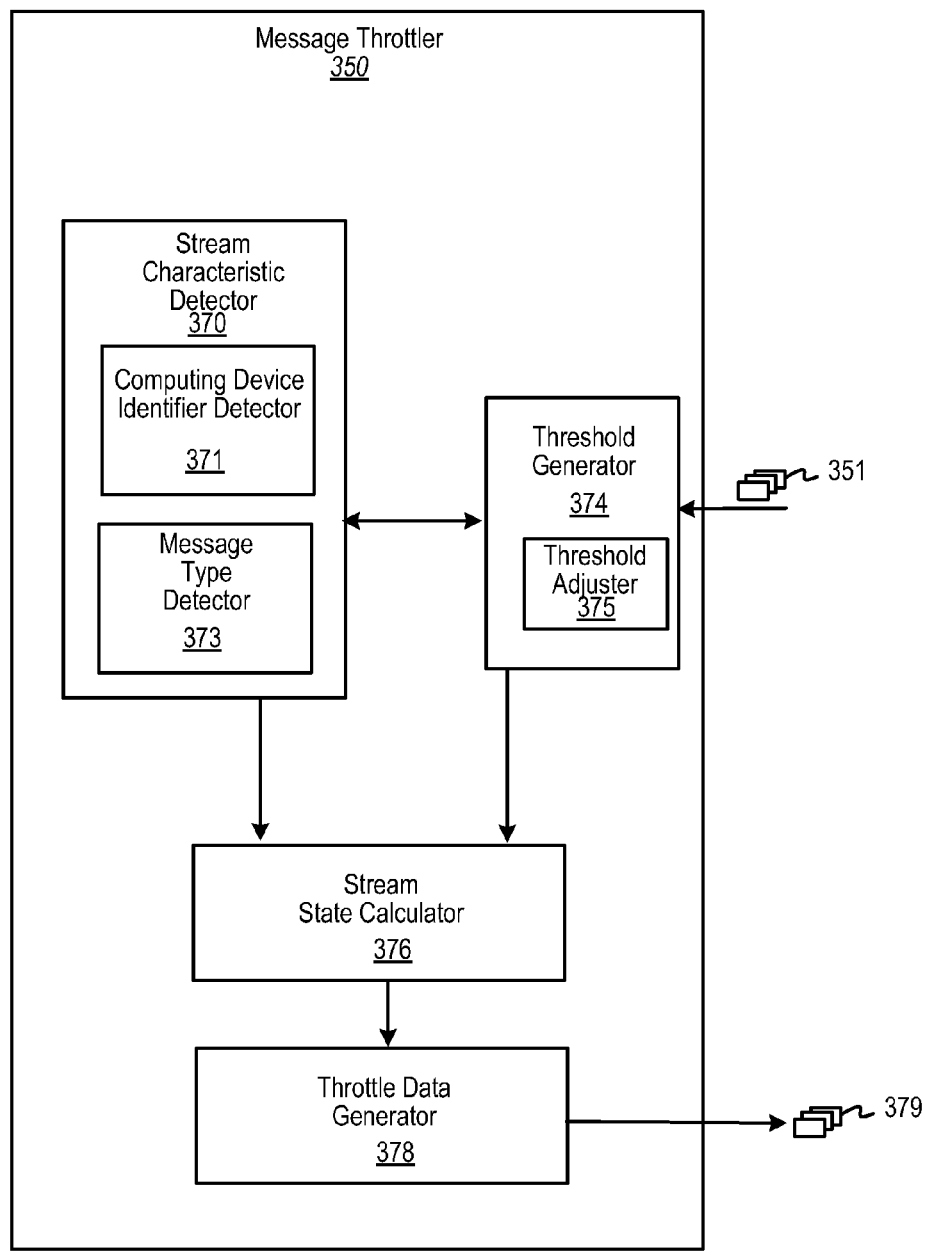
FIG. 3 is a functional block diagram of an example of a message throttler, according to some examples.

FIG. 3 is a functional block diagram of an example of a message throttler, according to some examples. Diagram 300 includes a message throttler 350 that may include a stream characteristic detector 370, a threshold generator 374, a stream state calculator 376, and a throttle data generator 378. Message throttler 350 and/or its elements depicted in diagram 300 of FIG. 3 may include structures and/or functions as similarly-named or similarly-numbered elements depicted in other drawings. Stream characteristic detector 370 may be configured to detect, in real-time or substantially in real-time, one or more characteristics of a data stream (e.g., one or more characteristics of message data) as the data stream flows between two elements of a distributed computing system. Stream characteristic detector 370 may also be configured to quantify or otherwise describe an attribute of the stream characteristic. For example, stream characteristic detector 370 may be configured to detect a value, a string, a regular expression, an alphanumeric code, or any other identifying data, such as an IP address, a MAC ID, or the like. In the example shown, stream characteristic detector 370 may include a computing device identifier detector 371, a message type detector 373, or any other logic configured to detect a specific characteristic of one or more messages.

Threshold generator 374 is configured to provide or otherwise generate either a static threshold value or a dynamically-generated threshold value for comparing against detected values to determine whether a subset of messages being monitored ought to be throttled. An example of a static threshold value may be "100 calls per second." Further, threshold adjuster 375 may be configured to generate and/or modify a threshold value dynamically responsive to data 351 or any other input or variable. Data 351 may include one or more types of different date, such as time of day, geographical location, or any other data that can be generated either external or internal to message throttler 350. As an example, dynamically-generated thresholds can be formed by modifying a value representing 100 calls per second to another value representing 50, 200, or 250 calls per second.

Stream state calculator 376 may be configured to receive data representing values of the detected stream characteristic from stream characteristic detector 370, and may be configured further to receive data representing threshold values from threshold generator 374. Further, stream state calculator 376 may be configured to determine a state of a stream characteristic for a particular parameter, such as over an interval of time. In some implementations, the state of a stream characteristic can be determined by aggregating or otherwise counting the number of instances in which, for example, a computing device identifier is detected (e.g., over a unit of time) for one or more subsets of messages in a data stream. Further, stream state calculator 376 may compare the number of instances to a threshold value, over which the number of instances per unit time may be viewed as non-compliant. Upon determining a threshold value is surpassed or otherwise beyond specified values, stream state calculator 376 is configured to cause throttle data generator 378 to generate and transmit throttle data 379, which, in turn, is configured to throttle, reduce, or eliminate transmission of one or more messages associated with a particular computer, a particular message type, or any specific parameter. In other cases, throttle data 379 can cause transmission of one or more messages to increase.

To illustrate operation of computing device identifier detector 371, consider a particular computing device is detected as having an identifier X0:0A:95:9D:68:F6 as a MAC ID. Computing device identifier detector 371 can generate a signal indicating a detected instance of X0:0A:95:9D:68:F6 in a data stream (or in a subset of messages) to state stream calculator 376. Further, consider that state stream calculator 376 can receive a threshold value of 500 calls per unit time (e.g., per second). State stream calculator 376 can calculate a number of times that stream characteristic "X0:0A:95:9D:68:F6" is detected in a data stream per unit time. And if that number exceeds 500 calls per unit time, state stream calculator 376 may generate a signal for transmission to throttle data generator 378 to initiate generation of throttle data 379.

Similarly, message type detector 373 may be configured to detect instances of a specific message type, such as a request to "search property listings" (e.g., "GET /listings," or the like), etc., flowing past a point of access during a unit of time. Note that stream characteristic detector 370 may be configured to receive or otherwise detect any type of characteristics of a data stream or message data, and is not limited to the examples described above. According to some examples, message throttle 350 (or portions thereof) may be implemented "in-memory" (e.g., RAM, etc.).

Figure 4:
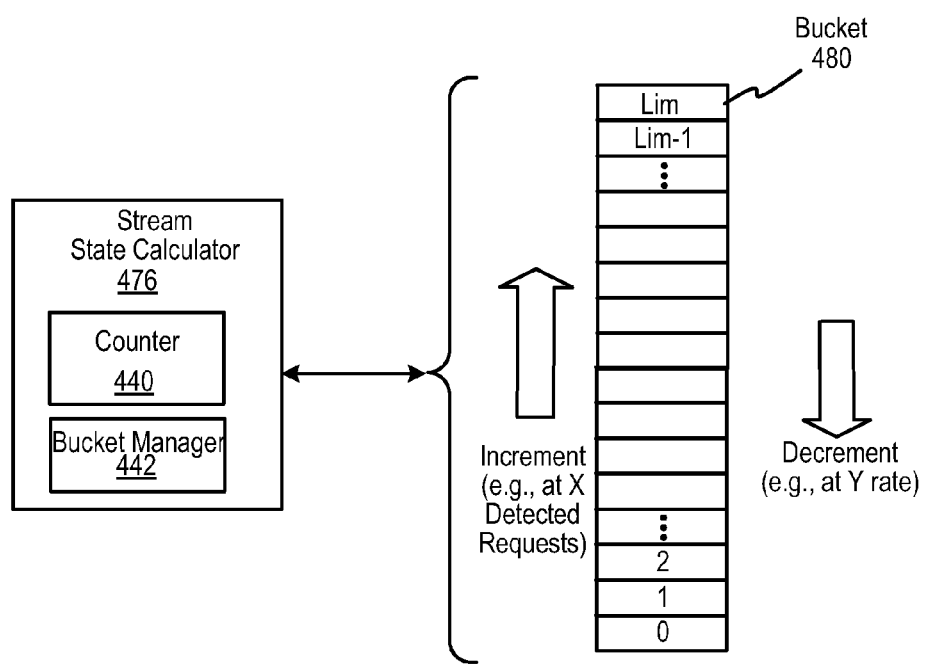
FIG. 4 depicts an example of a stream state calculator, according to some examples.

FIG. 4 depicts an example of a stream state calculator, according to some examples. Diagram 400 depicts stream state calculator 476 including a counter 440 and a bucket manager 442. Counter 440 is configured to count an instance of a detected stream characteristic, such as a call or a request associated with the computing device identifier. Bucket manager 442 is configured to manage a bucket 480, which may represent allocated memory for determining whether a detected number of stream characteristic instances exceeds a throttle limit ("Lim"). For example, bucket manager 442 can increment a value in bucket 480 for each detected instance of a stream characteristic (e.g., incrementing from 0 to 1, from 1 to 2, etc.). Further, bucket manager can decrement the value at a particular rate, such as 100 calls per unit time. Therefore, if bucket manager 442 increments the value in bucket 480 faster than the value can be decremented, then a number of calls detected per unit time may exceed the throttle limit, Lim. An exceeded throttle limit indicates a noncompliant value or state exists for a particular stream characteristic, whereby a throttler (not shown) can be configured to reduce or cease transmission of certain messages to address the noncompliant condition. According to some embodiments, bucket 480 may be implemented as a quantized time bucket. Note, too, that bucket 480 can be implemented in a variety of ways and the example shown in FIG. 4 is for illustration purposes. As such, bucket 480 and its structure/functionality is not limited to that shown in FIG. 4.

Figure 5:
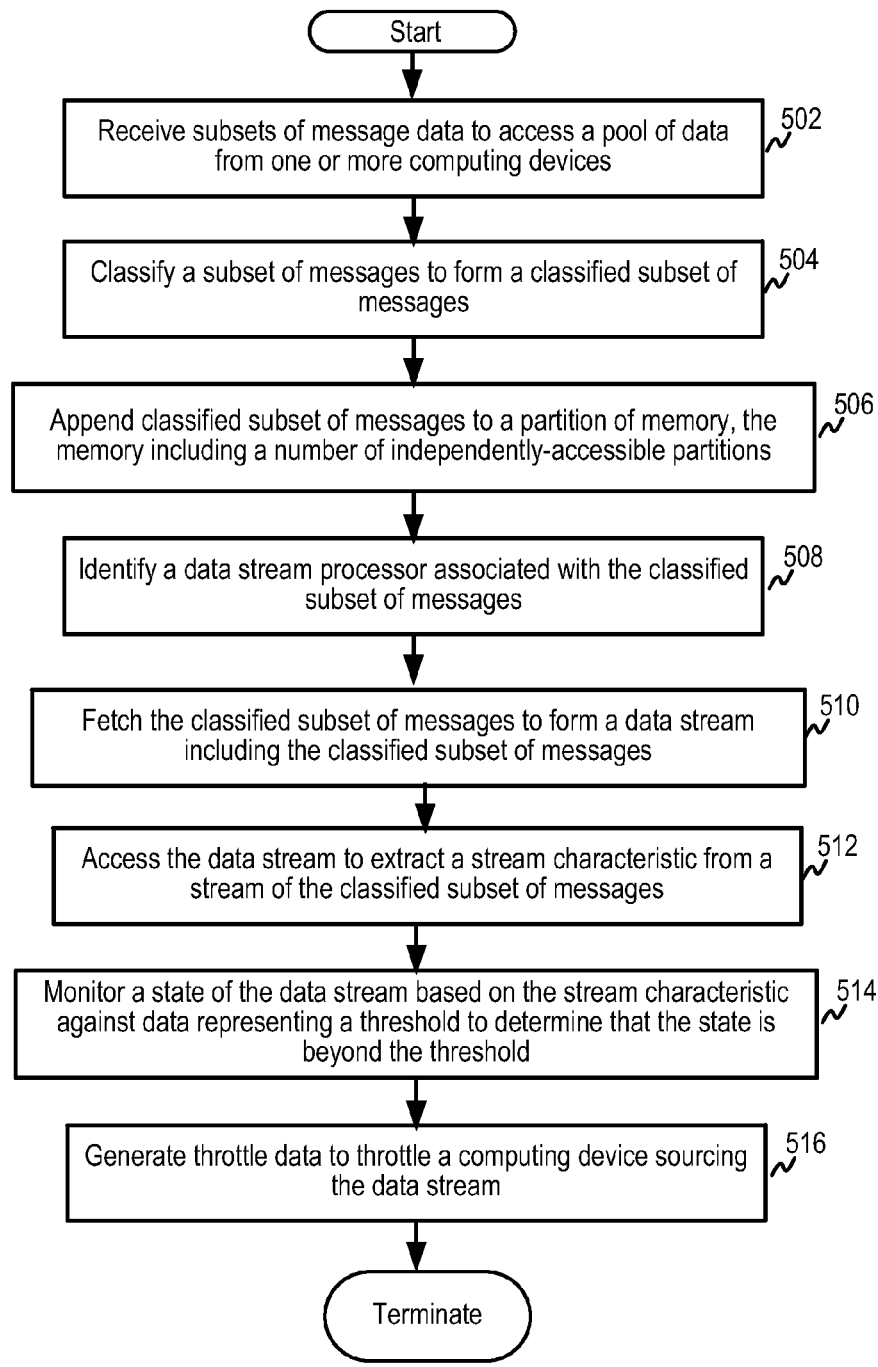
FIG. 5 is an example of a flow diagram to throttle message data in a distributed computing system, according to some embodiments.

FIG. 5 is an example of a flow diagram to throttle message data in a distributed computing system, according to some embodiments. At 502, flow 500 begins when one or more subsets of message data are received from one or more computing devices. The subsets of message data may include calls or requests, such as of the form "PUT X" and "GET Y," or the like, and may further include data representing an event. At 504, at least one subset of messages is classified to form a classified subset of messages. In some examples, the classification can indicate a type of message, such as a search query message, or a type of event. At 506, the classified subset of messages may be appended to a data arrangement, partition, or log, whereby the data arrangements may include a number of independently-accessible partitions. At 508, a data stream processor associated with processing the classified subset of messages may be identified, whereby the classified subset of messages can be fetched to form a data stream at 510. At 512, a data stream processor may access the data stream (e.g., in real-time) to extract a stream characteristic, whereby a state of the data stream and/or stream characteristic may be monitored at 514 against data representing a threshold value. Upon determining that the state of the data stream and/or value of a stream characteristic may be noncompliant relative to the threshold value, flow 500 moves to 516, at which throttle data is generated.

Figure 6:
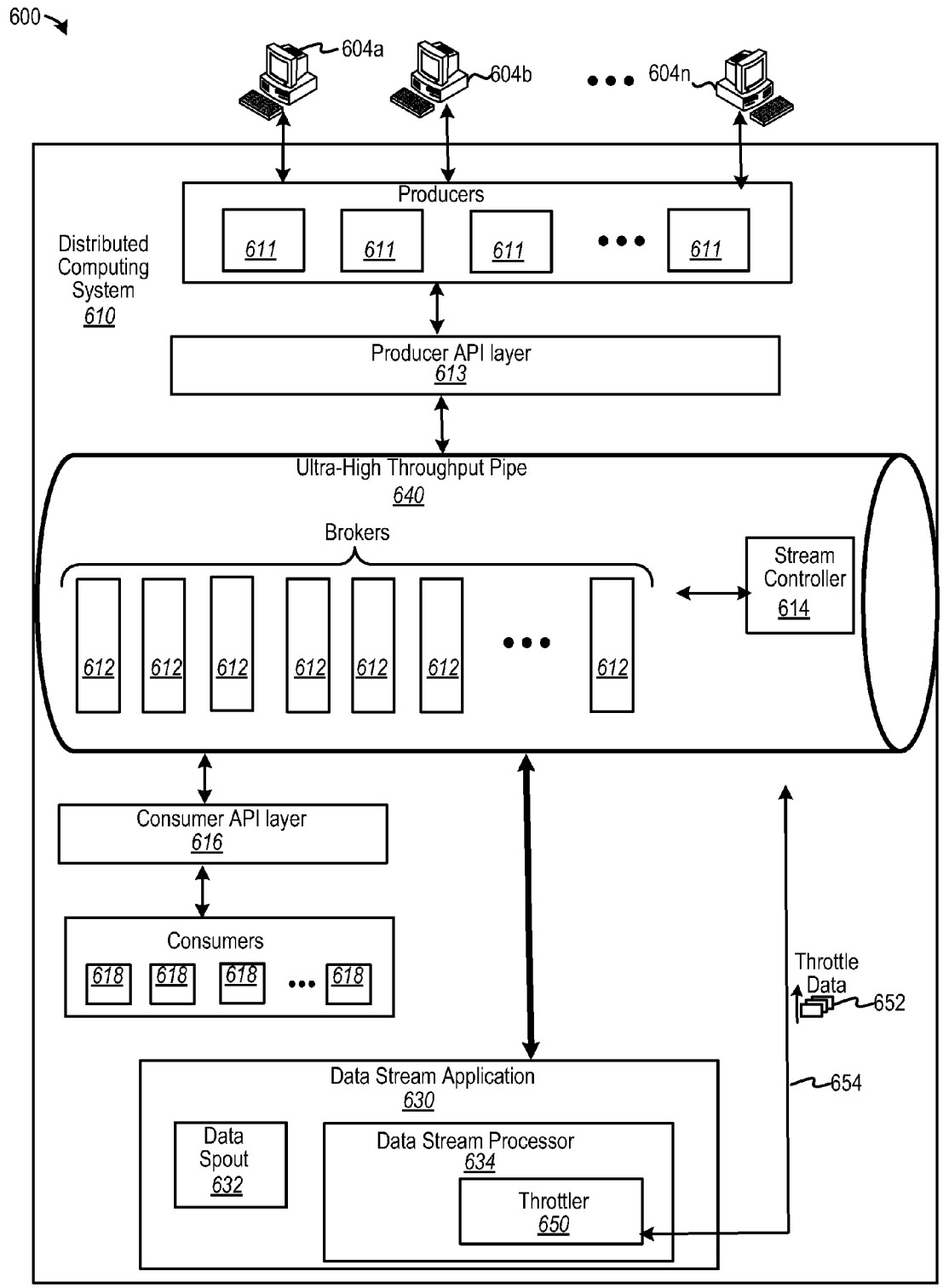
FIG. 6 depicts an example of a framework for a throttled distributed computing system, according to some examples.

FIG. 6 depicts an example of a framework for a throttled distributed computing system, according to some examples. Diagram 600 depicts any number of computing devices 604a to 604n in electronic communication with distributed computing system 610. As shown, distributed computing system 610 includes a number of producer processes ("producers") 611 coupled to a producer application programming interface ("API") layer 613, which may include one or more producer APIs. Further, distributed computing system 610 includes an ultra-high throughput pipe 640 coupled to a consumer application programming interface ("API") layer 616, which, in turn, is coupled to a number of consumer processes ("consumers") 618.

Producers 611 may include hardware (e.g., processors and memory), software, or a combination thereof, and may be configured to receive calls from one or more computing devices 604a to 604n. Further, producers 611 may be configured to transmit message data via producer APIs 613 to ultra-high throughput pipe 640. According to some examples, producer APIs 613 may be configured to retrieve a list of data arrangements or partitions to which records or message data may be transmitted (e.g., published).

As shown, ultra-high throughput pipe 640 is shown to include a number of brokers 612 and a stream controller 614, which may include structures and/or functions as similarly-named or similarly-numbered elements depicted in other drawings. According to some examples, brokers 612 each can represent a server process and/or server computing device configured to include log files associated with a partition "topic." Stream controller 614 may be configured to control or otherwise guide published messages transmitted from producers 611 via producer APIs 613 to a corresponding broker 612, at which incoming messages are appended to a logical log file. Stream controller 614 may also address messages in a log file by a logical offset relative to sequential message IDs, according to some examples. Note that in some implementations, messages may persist in brokers 612 absent a database schema and/or application.

Consumers 618 may include hardware (e.g., processors and memory), software, or a combination thereof, and may be configured to receive or subscribe to one or more brokers 612. Further, consumers 618 may be configured to transmit fetch data messages via consumer APIs 616 to ultra-high throughput pipe 640. According to some examples, consumer APIs 613 may be configured to retrieve a list of message IDs and/or offsets with which to access the data arrangements or partitions (e.g., for a certain topic) from which records or data may be received (e.g., via subscription).

According to at least some embodiments, the above-described elements of distributed computing system 610 may be implemented in accordance with an architecture and/or framework implemented similar to, or consistent with, a Apache® Kafka™ messaging system, which is maintained by the Apache Software Foundation, at www(.) apache(.)org. Stream controller 614 may be implemented, at least in some examples, as a service implementing Apache ZooKeeper™ as maintained by the Apache Software Foundation.

Distributed computing system 610 of diagram 600 further includes a data stream application 630 that may be configured to provide data stream processing, and further may be configured to include a data spout 632 and a data stream processor 634, according to some examples. An example of a data spout 632 may be implemented as hardware, software, or a combination thereof, that may be configured to retrieve data from broker 612 and generate specific data streams that are configured for real-time data processing. In some examples, data spout 632 can generate data streams formatted as tuples. According to some embodiments, data spout 632 may be configured or adapted to operate as a consumer 618.

Data stream processor 634 may be configured to access data streams produced by data spout 632, and may be further configured to perform processing on one or more input data streams. For example, data stream processor 634 may include logic to implement throttler 650 as a function (e.g., a counting function, or increment and/or decrement functions). Therefore, logic in throttler 650 may be used to determine whether a number of calls from a specific computer (or relative to any other stream characteristic) exceeds a threshold amount based on data accessed in real-time. Thus, throttler 650 may be configured to throttle or cease transmission of messages in real-time or substantially in real-time.

According to at least some embodiments, the above-described elements of data stream application 630 of distributed computing system 610 may be implemented in accordance with an architecture and/or framework similar to, or consistent with, a Apache® Storm™ messaging system, which is maintained by the Apache Software Foundation, at www(.)apache(.)org. As such, data spout 632 may be implemented, at least in some examples, as an Apache Storm Spout™ and data stream processor 634 may be implemented, at least in some examples, as an Apache Storm Bolt™, whereby specifications for implementing both Spout and Bolt are maintained by the Apache Software Foundation.

Message throttler 650 may generate throttle data 652, responsive to detecting a non-conforming value (e.g., a non-compliant number of calls per unit time), whereby throttle data 652 may include an executable instruction to suspend processing a subset of messages (e.g., associated with a specific the computing device), as well as data representing a time at which the processing of the subset of messages is re-enabled (e.g., a computing device may be disabled or barred from accessing distributed computing system 610 for one second). According to some examples, throttle data 652 may be transmitted via path 654 to any element in distributed computing system 610, such as messaging streams 611 or other elements therein. In some examples, path 654 may be implemented using RabbitMQ™ messaging developed by Pivotal Software, Inc. of Palo Alto, Calif., U.S.A, or other message broker software applications.

Note that elements depicted in diagram 600 of FIG. 6 may include structures and/or functions as similarly-named or similarly-numbered elements depicted in other drawings.

Figure 7:
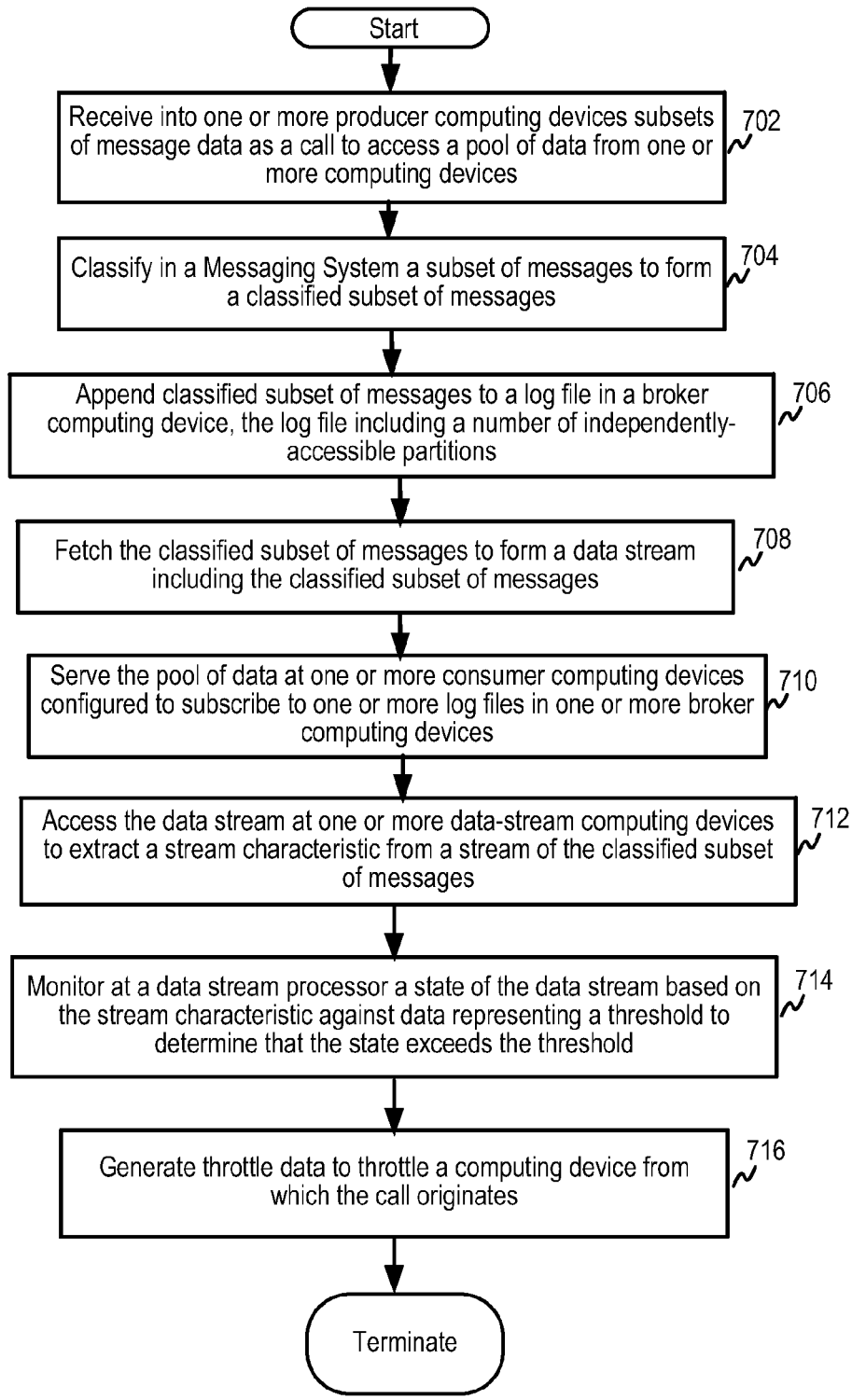
FIG. 7 is another example of a flow diagram to throttle message data in a distributed computing system, according to some embodiments.

FIG. 7 is another example of a flow diagram to throttle message data in a distributed computing system, according to some embodiments. At 702, flow 700 begins when one or more producer computing devices receive message data as one or more calls. Producer computing device may include logic that is configured to support a producer processor and/or a producer API. At 704, at least one subset of messages is classified to form a classified subset of messages. In some examples, the classification can indicate a type of message, such as a search query message, or a type of event. At 706, the classified subset of messages may be appended to a log disposed in a broker computing device, whereby the log may include a number of independently-accessible partitions. At 708, a consumer process or device and/or a consumer API may be configured to fetch classified subset of messages, whereby the classification relates to or defines a "topic." One or more consumer computing devices that are configured to subscribe to log files in the broker computing devices may also serve content at 710 from the pool of data to the producer computing devices, which, in turn, may present the data (e.g., as a web page) to users of computing devices. At 712, at least one data stream computing device can access a data stream (e.g., from a data spout) to extract the stream characteristic, whereby a data stream processor (e.g., a Storm Bolt) may monitor the state of the stream characteristic for purposes determine whether a threshold value is exceeded at 714. If so, throttle data may be generated at 716.

Figure 8:
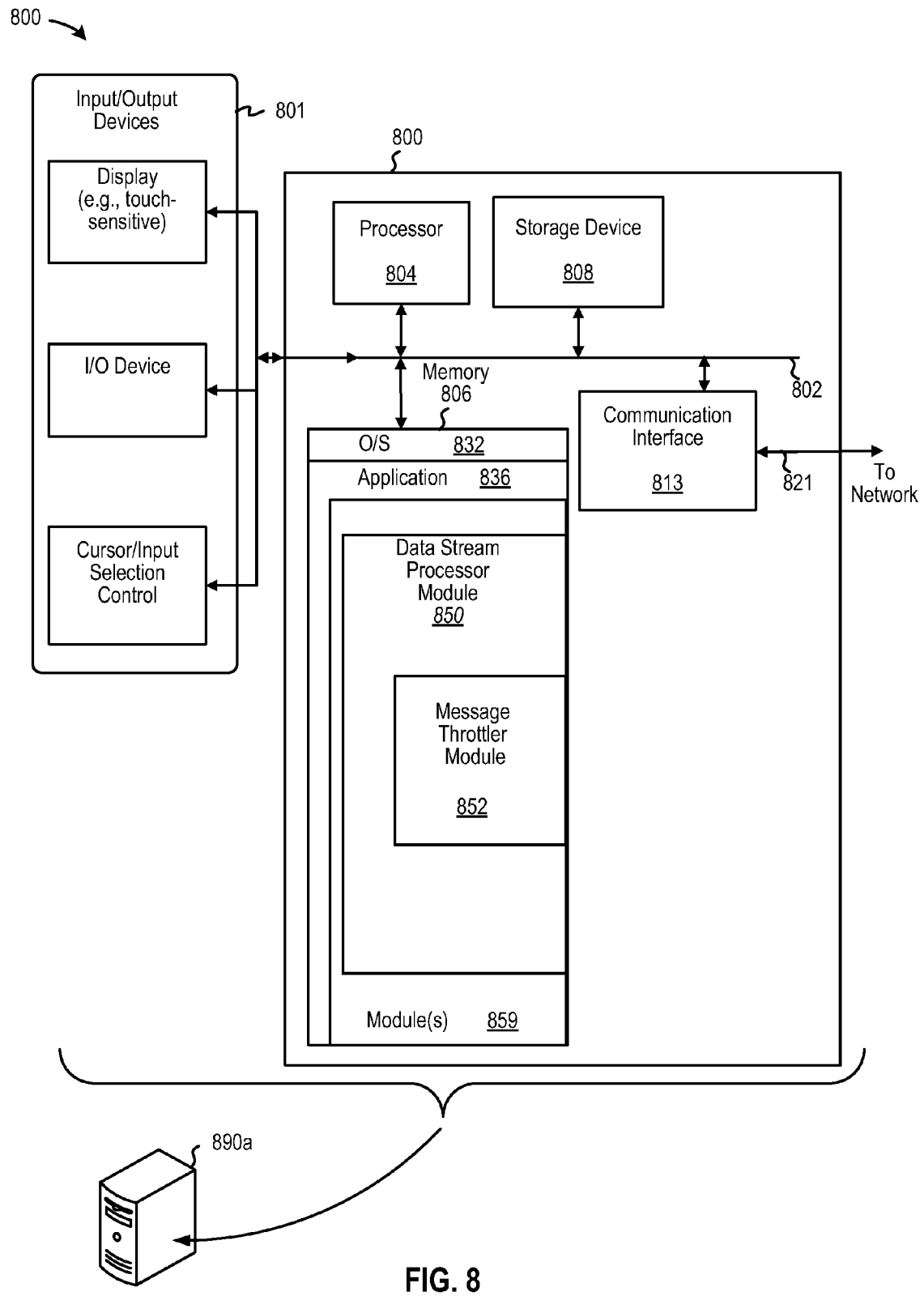
FIG. 8 illustrates an exemplary computing platform disposed in a computing system configured to establish a distributed computing system configured to throttle message data in accordance with various embodiments.

FIG. 8 illustrates an exemplary computing platform disposed in a computing system configured to establish a distributed computing system configured to throttle message data in accordance with various embodiments. In some examples, computing platform 800 may be used to implement computer programs, applications, methods, processes, algorithms, or other software to perform the above-described techniques.

In some cases, computing platform 800 can be disposed in any device, such as a computing device 890*a*.

Computing platform 800 includes a bus 802 or other communication mechanism for communicating information, which interconnects subsystems and devices, such as processor 804, system memory 806 (e.g., RAM, etc.), storage device 808 (e.g., ROM, etc.), a communication interface 813 (e.g., an Ethernet or wireless controller, a Bluetooth controller, etc.) to facilitate communications via a port on communication link 821 to communicate, for example, with a computing device, including mobile computing and/or communication devices with processors. Processor 804 can be implemented with one or more central processing units ("CPUs"), such as those manufactured by Intel® Corporation, or one or more virtual processors, as well as any combination of CPUs and virtual processors. Computing platform 800 exchanges data representing inputs and outputs via input-and-output devices 801, including, but not limited to, keyboards, mice, audio inputs (e.g., speech-to-text devices), user interfaces, displays, monitors, cursors, touch-sensitive displays, LCD or LED displays, and other I/O-related devices.

According to some examples, computing platform 800 performs specific operations by processor 804 executing one or more sequences of one or more instructions stored in system memory 806, and computing platform 800 can be implemented in a client-server arrangement, peer-to-peer arrangement, or as any mobile computing device, including smart phones and the like. Such instructions or data may be read into system memory 806 from another computer readable medium, such as storage device 808. In some examples, hard-wired circuitry may be used in place of or in combination with software instructions for implementation. Instructions may be embedded in software or firmware. The term "computer readable medium" refers to any tangible medium that participates in providing instructions to processor 804 for execution. Such a medium may take many forms, including but not limited to, non-volatile media and volatile media. Non-volatile media includes, for example, optical or magnetic disks and the like. Volatile media includes dynamic memory, such as system memory 806.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 802 for transmitting a computer data signal.

In some examples, execution of the sequences of instructions may be performed by computing platform 800. According to some examples, computing platform 800 can be coupled by communication link 821 (e.g., a wired network, such as LAN, PSTN, or any wireless network, including WiFi of various standards and protocols, Blue Tooth®, Zig-Bee, etc.) to any other processor to perform the sequence of instructions in coordination with (or asynchronous to) one another. Computing platform 800 may transmit and receive messages, data, and instructions, including program code (e.g., application code) through communication link 821 and communication interface 813. Received program code may be executed by processor 804 as it is received, and/or stored in memory 806 or other non-volatile storage for later execution.

In the example shown, system memory 806 can include various modules that include executable instructions to implement functionalities described herein. System memory 806 may include an operating system ("O/S") 832, as well as an application 836 and/or logic module(s) 859. In the example shown, system memory 806 includes a data stream processor module 850, which includes a message throttler module 852, one or more portions of which can be configured to throttle messaging data in a distributed computing system by implementing one or more functions described herein.

In at least some examples, the structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, data stream processor module 850, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 859 and data stream processor module 850, or one or more of its components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figure can represent one or more algorithms. Or, at least one of the elements can represent a portion of logic including a portion of hardware configured to provide constituent structures and/or functionalities.

For example, a data stream processor module 850, or one or more of its components, or any process or device described herein, can be implemented in one or more computing devices (i.e., any mobile computing device, such as a wearable device, an audio device (such as headphones or a headset) or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, a data stream processor module 850, or one or more of its components, or any process or device described herein, can be implemented in one or more computing devices that include one or more circuits. Thus, at least one of the elements in the above-described figures can represent one or more components of hardware. Or, at least one of the elements can represent a portion of logic including a portion of circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed:
1. A computer-implemented method comprising:
under control of a computing system comprising one or more processors configured to execute specific instructions,
receiving, from one or more computing devices, message data to access a pool of data, wherein a message represented by the message data corresponds to an application programming interface call from a computing device of the one or more computing devices to access the pool of data;
classifying a subset of messages into a classified subset of messages;
storing the classified subset of messages to a partition of memory, the memory including a plurality of independently-accessible partitions, wherein the partition is from the plurality of independently-accessible partitions;
accessing a data stream including the classified subset of messages;
determining a stream characteristic for the data stream;

receiving additional message data associated with the data stream, wherein the additional message data represents a plurality of additional messages to access the pool of data;
incrementing a value of the stream characteristic for each additional message of the plurality of additional messages;
reducing the value of the stream characteristic by a quantity per unit of time;
determining that the value of the stream characteristic satisfies a threshold;
generating throttle data; and
throttling handling of subsequent message data received from the computing device based at least in part on the throttle data.

2. The computer-implemented method of claim 1, further comprising monitoring the value of the stream characteristic concurrently with receiving at least a portion of the additional message data.

3. The computer-implemented method of claim 1, wherein accessing the data stream comprises accessing directly data representing the stream characteristic from the data stream.

4. The computer-implemented method of claim 1, wherein generating the throttle data comprises embedding in the throttle data:
an instruction to suspend processing of the subsequent message data received from the computing device; and
data representing a time at which the processing of the subsequent message data received from the computing device is re-enabled.

5. The computer-implemented method of claim 1, further comprising determining the threshold as a value representing a threshold number of calls by the computing device per unit of time.

6. The computer-implemented method of claim 5, further comprising
determining data representing an identifier of the computer device;
transmitting an instruction to suspend processing of the subsequent message data received from the computing device for a duration of time.

7. The computer-implemented method of claim 5, further comprising:
accessing the value of the threshold stored in memory; and
implementing at least a portion of a data stream processor in memory.

8. The computer-implemented method of claim 1, further comprising determining the threshold as a value representing a number of calls associated with a type of message per unit of time.

9. The computer-implemented method of claim 8, further comprising determining the type of message subject to throttling wherein determining that the value of the stream characteristic satisfies the threshold comprises determining that a quantity of calls associated with the type of message exceeds the threshold.

10. The computer-implemented method of claim 1, further comprising adjusting a value of the threshold from a first threshold value to a second threshold value based at least in part on the stream characteristic.

11. A system comprising:
a data store; and
one or more computing devices in communication with the data store and configured to at least:
receive message data representing one or more programmatic calls to access a pool of data;
classify a subset of the message data into a classified subset of message data;
store the classified subset of message data in the data store;
determine a stream characteristic for a data stream, wherein the data stream includes the classified subset of message data;
receive additional message data associated with the data stream, wherein the additional message data represents a plurality of additional programmatic calls to access the pool of data;
increment a value of the stream characteristic for each additional programmatic call of the plurality of programmatic calls;
reduce the value of the stream characteristic by a quantity per unit of time;
determine that the value of the stream characteristic exceeds a threshold; and
generate throttle data representing an instruction to throttle handling of subsequent message data received from a remote computing device from which a programmatic call of the plurality of additional programmatic calls originates.

12. The system of claim 11, further comprising monitoring the value of the stream characteristic concurrently with receiving at least a portion of the additional message data.

13. The system of claim 11, wherein the one or more computing devices access data representing the stream characteristic directly from the data stream.

14. The system of claim 11, wherein the throttle data further represents a time at which the processing of subsequent message data received from the remote computing device is re-enabled.

15. The system of claim 11, wherein the one or more computing devices are further configured to at least:
determine data representing an identifier of the remote computer device; and
transmit an instruction to cease handling of subsequent message data received from the remote computing device for a duration of time.

16. A computer-implemented method comprising:
under control of a computing system comprising one or more processors configured to execute specific instructions,
receiving message data representing one or more programmatic calls to access a pool of data;
classifying a subset of the message data into a classified subset of message data;
storing the classified subset of message data to a log file, the log file including a number of independently-accessible partitions;
accessing a data stream including the classified subset of message data;
determining a stream characteristic of the data stream;
receiving additional message data associated with the data stream, wherein the additional message data represents a plurality of additional programmatic calls to access the pool of data;
incrementing a value of the stream characteristic for each additional programmatic call of the plurality of programmatic calls;
reducing the value of the stream characteristic by a quantity per unit of time;
determining that the value of the stream characteristic exceeds a threshold; and generating throttle data representing an instruction to throttle handling of subsequent message data received from a remote computing device from which a programmatic call of the plurality of additional programmatic calls originates.

17. The computer-implemented method of claim 16, further comprising monitoring the value of the stream characteristic concurrently with receiving at least a portion of the additional message data.

18. The computer-implemented method of claim 16, wherein accessing the data stream comprises accessing directly data representing the stream characteristic from the data stream.

19. The computer-implemented method of claim 16, wherein generating the throttle data comprises embedding in the throttle data:
   an instruction to suspend processing the subsequent message data received from the remote computing device; and
   data representing a time at which processing the subsequent message data received from the remote computing device is re-enabled.

20. The computer-implemented method of claim 16, further comprising:
   determining data representing an identifier of the remote computer device; and
   transmitting an instruction to cease handling of subsequent message data received from the remote computing device for a duration of time.

* * * * *

UNITED STATES PATENT AND TRADEMARK OFFICE
CERTIFICATE OF CORRECTION

PATENT NO. : 10,001,943 B2
APPLICATION NO. : 14/935209
DATED : June 19, 2018
INVENTOR(S) : Rene X. Parra Page 1 of 1

It is certified that error appears in the above-identified patent and that said Letters Patent is hereby corrected as shown below:

In the Claims

In Column 15, Line 56, Claim 9, please change "throttling" to --throttling,--.

Signed and Sealed this
Eleventh Day of June, 2019

Andrei Iancu
*Director of the United States Patent and Trademark Office*